O. M. ENGELBERT.
KEY CUTTING MACHINE.
APPLICATION FILED OCT. 20, 1911.

1,135,676.

Patented Apr. 13, 1915.

2 SHEETS—SHEET 1.

Witnesses:
O. W. Benjamin
Marie F. Wainright

Inventor
O. M. Engelbert
By his Attorney
T. F. Bourne

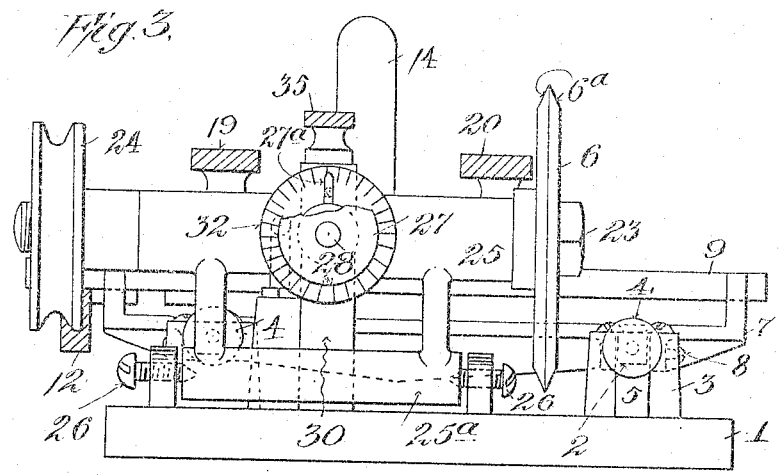
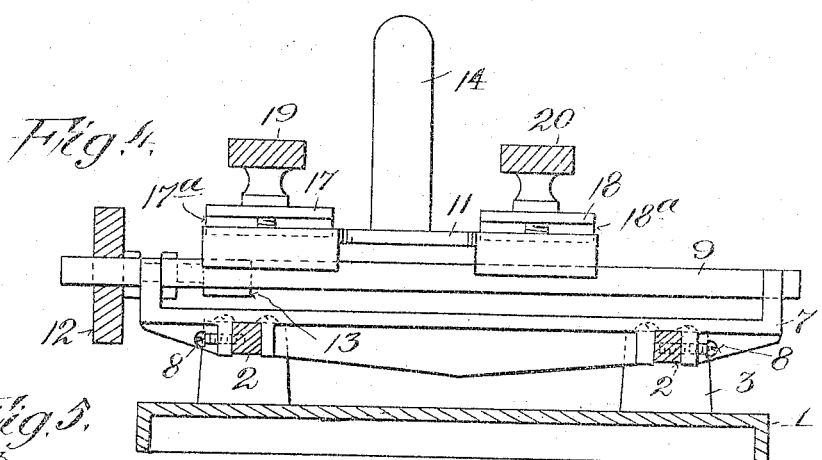
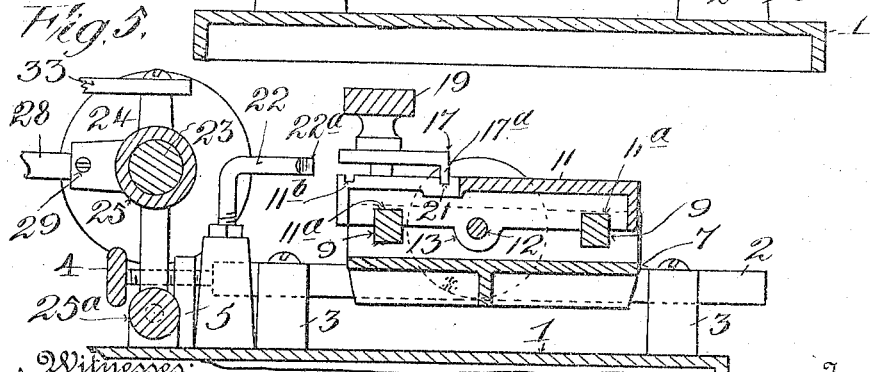

UNITED STATES PATENT OFFICE.

OSCAR M. ENGELBERT, OF NEW YORK, N. Y.

KEY-CUTTING MACHINE.

1,135,676.      Specification of Letters Patent.      Patented Apr. 13, 1915.

Application filed October 20, 1911. Serial No. 655,782.

*To all whom it may concern:*

Be it known that I, OSCAR M. ENGELBERT, a citizen of the United States, and resident of New York city, borough of Brooklyn, in the county of Kings and State of New York, have invented certain new and useful Improvements in Key-Cutting Machines, of which the following is a specification.

My invention relates to improvements in machines for cutting keys for locks, and has particular reference to cutting keys for cylinder locks, such as the wellknown Yalelock keys, the objects of my invention being to provide a machine that will accurately duplicate cylinder keys and will also reduce to any depth for master keys, wherein the member carrying the keys can be readily removed and replaced for examining the key while it is in set position on such member, and wherein one cutter will suffice for cutting all styles of cylinder keys.

My invention comprises novel details of improvement and combinations of parts that will be more fully hereinafter set forth and then pointed out in the claims.

Figure 1:
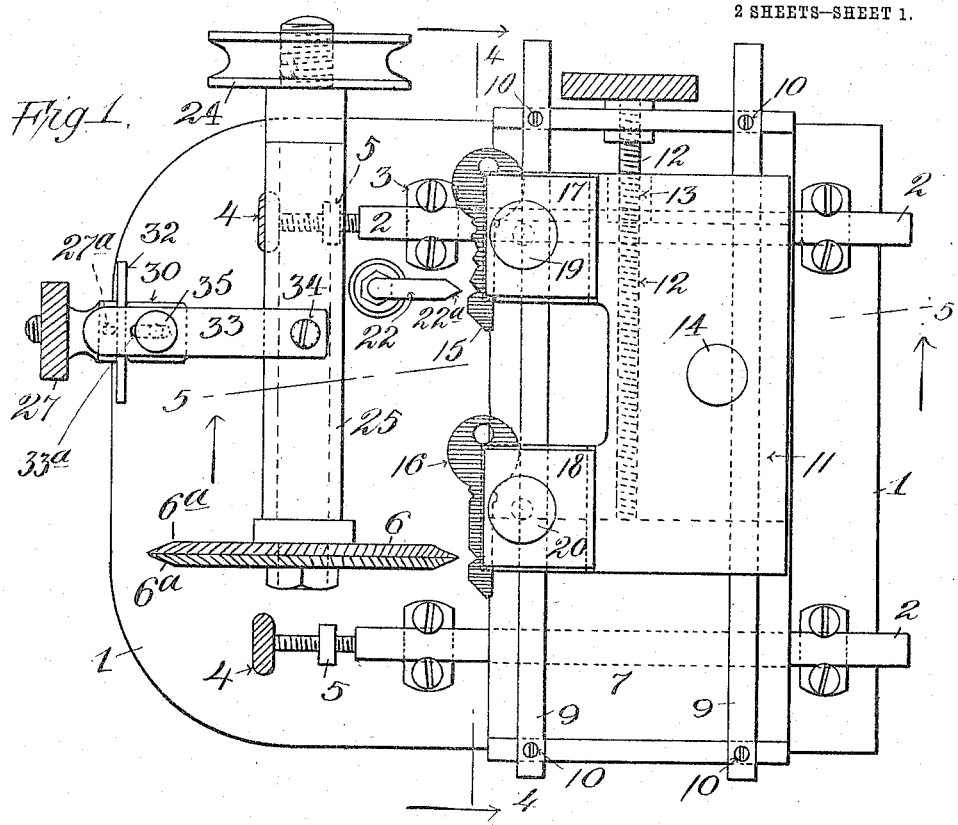
Figure 2:
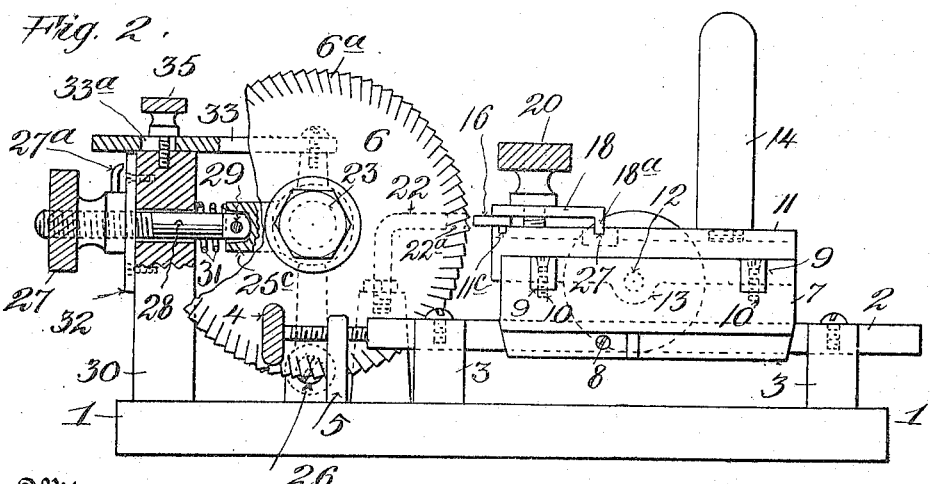

Reference is to be had to the accompanying drawings forming part hereof, wherein, Figure 1 is a plan view of a key cutting machine embodying my invention; Fig. 2 is a partly broken end view thereof; Fig. 3 is a front view of the machine; Fig. 4 is a section on the line 4, 4, in Fig. 1, and Fig. 5 is a section on the line 5, 5, in Fig. 1.

Similar numerals of reference indicate corresponding parts in the several views.

Upon a suitable base 1 spaced parallel bars 2 are suitably mounted to slide in suitable guides 3 carried by said base. Screws $3^a$ on guides 3 serve to guide the bars 2.

At 4 are adjusting screws alined with the ends of bars 2 and shown carried by lugs 5 on base 1, whereby the movement of bars 2 toward cutter 6 may be regulated as desired. The cutter 6 is shown having teeth $6^a$ upon opposite sides tapering to its periphery and forming an acute angle at the cutting edges adapted for cutting a key blank at one or both sides of the cutter as the latter rotates. To the bars 2, above base 1, is suitably secured a carriage member or plate 7, which may have movement toward and from cutter 6, being guided by bars 2. Carriage member 7 may be secured to bars 2 by screws 8. Upon carriage member or plate 7 are bars or guides 9, disposed at right angles to bars 2, which bars or guides 9 may be secured upon member 7 by screws 10. Upon bars 9 the upper carriage member or plate 11 is mounted to slide transversely with respect to cutter 6, the under side of member 11 being shown provided with grooves $11^a$ slidably receiving the guiding bars 9. A screw 12 mounted to rotate upon carriage member 7 meshes with threads or a nut 13 provided on plate or member 11, whereby the latter may be fed transversely with respect to the plane of cutter 6 as required. Plate or member 11 is provided with a handle 14 for manually moving the carriage toward and from the cutter. Means are provided upon member 11 for holding the pattern or master key 15 and the key blank 16, the latter being maintained in position to be operated upon by cutter 6. For this purpose I have shown clamping plates 17, 18, upon member 11, and adjustably held by screws 19, 20, respectively passing through apertures in clamping plates 17, 18, and entering threaded holes in member 11. The clamping plates 17, 18, at their rearward edges, have depending flanges or lugs $17^a$, $18^a$, adapted to enter corresponding recesses 21, in member 11 to retain the clamping plates 17, 18 in proper alinement. Member 11, under the forward edge portion of plates 17, 18, is shown provided with recesses $11^b$, $11^c$, to receive a rib that may be upon a key when the key is clamped between the parts 11 and 17 or 18. At 22 is a guiding finger carried by base 1 and projecting toward master or pattern key 15, to coact with the latter in causing guiding movements of the carriage when the key blank 16 is to be cut. The end $22^a$ of finger 22 is shown tapered to enter the notches in key 15.

The cutter 6 is shown carried by a shaft 23 having a pulley 24 and journaled in an oscillatory bearing member or bracket 25. The member or bracket 25 is pivotally mounted upon base 1 to rock toward and from the carriage. For this purpose I have shown screws 26 carried by base 1 pivotally supporting the horizontally disposed part $25^a$ of bearing member 25. For the purpose of accurate adjustment of cutter 6 with respect to the key blank, I provide a nut 27 mounted upon the threaded portion of a rod 28 that is pivotally connected at 29 with member 25, and passing freely through a standard 30 upon base 1.

A spring 31 interposed between standard 30 and the hub 25ᶜ of member 25 serves to retain the parts in operative relation and causes nut 27 to bear against a dial 32 carried by standard 30. The nut 27 has a pointer 27ᵃ to sweep over dial 32. The parts 27, 28, 31, 32 and 27ᵃ operate in the nature of a micrometer gage, the threads being cut carefully to enable adjustment of the cutter with respect to the key blank for cutting within thousandths of an inch, which will be found important since keys for cylinder locks are customarily made very accurate. In order to hold the cutter firmly in adjusted position, I provide a bar 33, shown secured at one end upon member 25, as by screw 34, and adjacent the other end provided with a slot 33ᵃ disposed over standard 30 and receiving a screw 35 entering a threaded hole in said standard, whereby the bearing 25 may be firmly locked to standard 30 after desired adjustment of cutter 6 has been made.

In accordance with my invention the pattern or master key 15 is secured in position upon the carriage in operative position with respect to guiding or regulating finger 22, and the key blank 16 is secured in proper position upon the carriage opposite cutter 6. The carriage member 11 is then, by means of screw 12, adjusted to bring key 15 into proper position with respect to finger 22; the carriage is then pushed forwardly to bring said key into contact with the adjacent edge of said finger; the carriage members are then maintained under forward tension by manual push upon handle 14 so that the key 15 is kept in contact with finger 22 which brings the key blank 16 into contact with the rotating cutter 6, and then as the work proceeds the screw 12 is rotated to cause carriage member 11 to move transversely with respect to the plane of the cutter (as from the top to the bottom in Fig. 1), and as key 15 thus travels in and out according to its cuts or teeth, in contact with finger 22, the carriage members 7 and 11 will be moved correspondingly and thereby the key blank 16 will be moved in contact with cutter 6 in accordance with the shape of the notches or teeth of key 15, the operator by properly bearing upon handle 14 permitting the carriage members to move in the directions required while maintaining the key blank in operating cutting relation to the cutter, the cutter at its side or sides cutting the teeth in the keyblank as the work proceeds.

By the means described the machine is adapted to cut any key for a cylinder lock accurately in accordance with the pattern or master key, and the machine will also reduce to any desired depth for master keys. The arrangement is such that vibration is reduced to a minimum and adjustments can be readily made for taking up wear. In order to examine the keys that are fastened upon the top of carriage member 11, the latter may be readily removed and replaced.

By means of my improvements a cutter having the same shape as the teeth or cuts in the key is not required, since the cutter 6 will cut all shapes of teeth in the key blank.

Changes may be made in the details of construction and arrangements set forth, within the scope of the appended claims, without departing from the spirit of my invention.

Having now described my invention what I claim is:—

1. The combination of a base, a cutter rotatively mounted thereon, means for feeding a key toward and from the cutter and transversely to the plane of the latter, a bearing supporting the cutter and movably carried by the base, a threaded rod extending from said bearing, a standard receiving said rod, a nut upon the rod, and a spring coacting with the bearing and the standard.

2. The combination of a base, a cutter rotatively mounted thereon, means for feeding a key toward and from the cutter and transversely to the plane of the latter, a bearing supporting the cutter and movably carried by the base, a threaded rod extending from said bearing, a standard receiving said rod, a nut upon the rod, a spring coacting with the bearing and the standard, a bar secured to the bearing and having a slot, said bar extending over the standard, and a screw carried by the standard and passing through said slot to rigidly hold the bearing in set position.

Signed at New York city, in the county of New York, and State of New York, this 18th day of October, A. D. 1911.

OSCAR M. ENGELBERT.

Witnesses:
CHAS. A. BRODEN,
T. F. BOURNE.